(12) United States Patent
Ueda

(10) Patent No.: US 10,002,289 B2
(45) Date of Patent: Jun. 19, 2018

(54) MOVING BODY TRACKING METHOD AND MOVING BODY TRACKING DEVICE

(71) Applicant: Panasonic Corporation, Osaka (JP)

(72) Inventor: Junko Ueda, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days. days.

(21) Appl. No.: 15/317,758

(22) PCT Filed: Jul. 27, 2015

(86) PCT No.: PCT/JP2015/003744
§ 371 (c)(1),
(2) Date: Dec. 9, 2016

(87) PCT Pub. No.: WO2016/021143
PCT Pub. Date: Feb. 11, 2016

(65) Prior Publication Data
US 2017/0124388 A1    May 4, 2017

(30) Foreign Application Priority Data

Jul. 27, 2015 (JP) .................. 2014-158569

(51) Int. Cl.
*G06K 9/00* (2006.01)
*G06T 7/70* (2017.01)
(Continued)

(52) U.S. Cl.
CPC ..... *G06K 9/00342* (2013.01); *G06K 9/00724* (2013.01); *G06K 9/00758* (2013.01);
(Continued)

(58) Field of Classification Search
None
See application file for complete search history.

(56) References Cited

U.S. PATENT DOCUMENTS

2015/0007658 A1\*  1/2015  Ishikawa ................. G01P 13/00
73/514.35
2015/0111657 A1\*  4/2015  Shibuya ............. G06K 9/00342
473/223
(Continued)

FOREIGN PATENT DOCUMENTS

JP        6-036031      2/1994
JP        06036031 A  * 2/1994
(Continued)

OTHER PUBLICATIONS

International Search Report of PCT application No. PCT/JP2015/003744 dated Sep. 1, 2015.
(Continued)

*Primary Examiner* — Delomia L Gilliard
(74) *Attorney, Agent, or Firm* — Greenblum & Bernstein, P.L.C.

(57) ABSTRACT

A moving body tracking method and a moving body tracking device detect a position of a moving body in each of a plurality of frame images which configure a video, detect a trajectory of the moving body based on the image which is obtained by using the plurality of frame images, determine a final position of the moving body in each of the plurality of frame images based on the detected position and the position of the moving body which is obtained from the detected trajectory, and output the determined position.

18 Claims, 9 Drawing Sheets

(51) Int. Cl.
*G06K 9/62* (2006.01)
*G06T 11/60* (2006.01)

(52) U.S. Cl.
CPC .............. *G06K 9/6215* (2013.01); *G06T 7/70* (2017.01); *G06T 11/60* (2013.01); *G06T 2207/30224* (2013.01); *G06T 2207/30241* (2013.01)

(56) References Cited

U.S. PATENT DOCUMENTS

2015/0317801 A1* 11/2015 Bentley .................. H04N 7/181 382/107
2017/0161913 A1* 6/2017 Khazanov .......... H04N 5/23245

FOREIGN PATENT DOCUMENTS

JP 2004-046647 2/2004
JP 2004046647 A * 2/2004

OTHER PUBLICATIONS

The Extended European Search Report dated Jul. 26, 2017 for the related European Patent Application No. 15830240.6.

Lepetit V et al: "Robust data association for online applications", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition] Los Alamitos, Calif. U.A, vol. 1, Jun. 18, 2003 (Jun. 18, 2003), pp. 281-288, XP010644909.

Gang-Yan et al: "Motion detection based on spatia-temporal saliency perception", 2013 International Conference on Machine Learning and Cybernetics, IEEE, vol. 2, Jul. 14, 2013 (Jul. 14, 2013), pp. 948-951, XP032637572.

Kim Shearer et al: "Combining multiple tracking algorithms for improved general performance", Pattern Recognition, Elsevier, GB, vol. 34, No. 6, Jun. 2001 (Jun. 2001), pp. 1257-1269, XP009095281.

* cited by examiner

MOVING BODY TRACKING METHOD AND MOVING BODY TRACKING DEVICE

CROSS-REFERENCE TO RELATED APPLICATIONS

This application is a U.S. national stage application of the PCT International Application No. PCT/JP2015/003744 filed on Jul. 27, 2015, which claims the benefit of foreign priority of Japanese patent application No. 2014-158569 filed on Aug. 4, 2014, the contents all of which are incorporated herein by reference.

TECHNICAL FIELD

The present disclosure relates to a moving body tracking method and a moving body tracking device.

BACKGROUND ART

In the related art, a moving body tracking device which tracks a moving body in a video is known. For example, in a technique described in PTL 1, a prediction position of the moving body in a present frame is obtained based on positional information of the moving body in a past frame. Candidate objects having a specific predetermined feature in the moving body are extracted from image data in the present frame and the candidate object closer to the prediction position among the extracted candidate objects is allocated as a moving body.

CITATION LIST

Patent Literature

PTL 1: Japanese Patent Unexamined Publication No. 2004-46647

SUMMARY OF THE INVENTION

However, in the technique disclosed in PTL 1, there is a problem in that a moving body to be tracked is tracked by mistake with the other moving body in some cases. For example, in a sport game using a ball (moving body) such as a soccer game, it is difficult to track the ball compared to track a player. That is, since a color or a shape of the ball is similar to a foot (shoes) of the player, when the ball approaches the foot of the player, an error in tracking occurs. Furthermore, there is a case where the ball is concealed by the player. In this case, it is difficult to accurately track the ball.

An object of the present disclosure is to provide a moving body tracking method and a moving body tracking device which are capable of tracking a moving body in a video with high accuracy.

In the moving body tracking method according to the present disclosure, a position of the moving body is detected in each of the plurality of frame images which configure the video. The trajectory of the moving body is detected based on the image which is obtained by using the plurality of frame images. Furthermore, a final position of the moving body in each of the plurality of frame images is determined based on the detected position and the position of the moving body which is obtained from the detected trajectory and the determined position is output.

In the moving body tracking device according to the present disclosure, a processor detects a position of a moving body in each of a plurality of frame images which configure a video. A trajectory of the moving body is detected based on the image obtained by using the plurality of frame images. Furthermore, a final position of the moving body in each of the plurality of frame images based on the position of the detected moving body and the position of the moving body which is obtained from the trajectory of the detected moving body, and the determined position is output.

According to the present disclosure, the moving body can be tracked in the video with high accuracy.

DESCRIPTION OF EMBODIMENT

Figure 1:
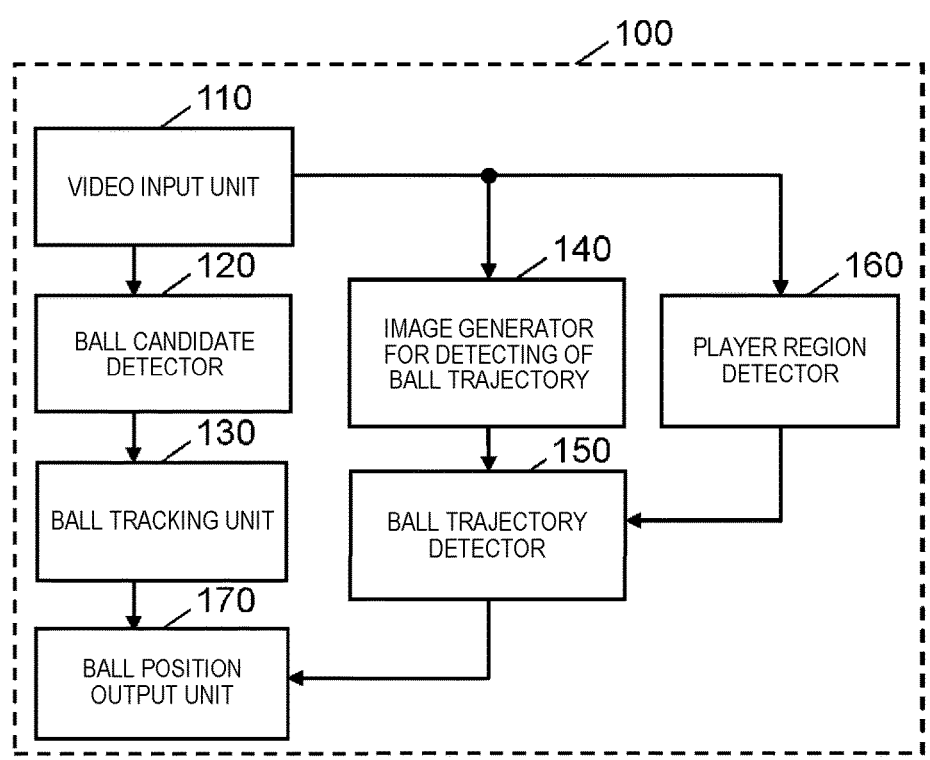
FIG. 1 is a diagram illustrating a functional configuration of a moving body tracking device in the present exemplary embodiment.

Hereinafter, the present exemplary embodiment will be described in detail based on drawings. FIG. 1 is a diagram illustrating a functional configuration of moving body tracking device 100 according to an exemplary embodiment of the present disclosure. Moving body tracking device 100 is a device for tracking a moving body in an input video. In the present exemplary embodiment, in a sport video in which a soccer game which is an example of sport games is imaged, moving body tracking device 100 tracks a ball (moving body) used in the soccer game.

Moving body tracking device 100 includes video input unit 110, ball candidate detector 120, ball tracking unit 130 which serves as a position detector, image generator for detecting of ball trajectory 140, ball trajectory detector 150 which serves as a trajectory detector, player region detector 160, and ball position output unit 170 which serves as a position output unit.

Although not illustrated, moving body tracking device 100 includes, for example, a central processing unit (CPU) as a processor, a storage medium such as a read only memory (ROM) which stores a control program, a working memory such as a random access memory (RAM), and a communication circuit. In this case, functions of each of the above-described parts are obtained by executing the control program through the CPU.

Video input unit 110 inputs the video which is configured from the plurality of frame images. Video input unit 110 outputs the input video to ball candidate detector 120, image generator for detecting of ball trajectory 140, and player region detector 160.

In each of the plurality of frame images which configure the video output from video input unit 110, ball candidate detector 120 detects a region having a high possibility of presence of the ball to be used in the soccer game as a ball candidate region. Ball candidate detector 120 outputs a position in a frame image of the detected ball candidate region and the frame image to ball tracking unit 130. A detailed process for detecting the ball candidate region will be described below.

In the frame image output from ball candidate detector 120, ball tracking unit 130 calculates ball likelihood based on a feature amount of the ball candidate region. Here, the ball likelihood is a measure quantitatively indicating how likely the ball candidate region is to be the region in which the ball is actually present. Ball tracking unit 130 determines whether the ball likelihood of the ball candidate region is equal to or more than a predetermined threshold value, and in a case where the ball likelihood is equal to or more than the predetermined threshold vale, detects the position of the ball candidate region as a first ball position. In a case where the plurality of ball candidate regions are present in the frame image output from ball candidate detector 120, ball tracking unit 130 calculates the ball likelihood for each of the plurality of ball candidate regions, and detects the position of the ball candidate region which has the predetermined threshold value or more and a higher ball likelihood as the first ball position. Ball tracking unit 130 outputs the detected first ball position to ball position output unit 170.

In each of the plurality of frame images which configure the video output from video input unit 110, player region detector 160 detects a region having a high possibility that a player run in the soccer game is present as a player candidate region. Player region detector 160 calculates player likelihood based on a feature amount of the detected player candidate region. Here, the player likelihood is a measure quantitatively indicating how likely the player candidate region is to be the region in which the player is actually present. Player region detector 160 determines whether the player likelihood of the player candidate region is equal to or more than the predetermined threshold value, and in a case where the player likelihood is equal to or more than the predetermined threshold value, outputs the position of the player candidate region as the player region to ball trajectory detector 150.

Image generator for detecting of ball trajectory 140 inputs the video output from video input unit 110 and generates an image for detecting a ball trajectory for detecting a trajectory of the ball in a unit of the plurality of frame images. Image generator for detecting of ball trajectory 140 outputs the generated image for detecting a ball trajectory to ball trajectory detector 150. A detailed process for generating the image for detecting a ball trajectory will be described.

Ball trajectory detector 150 detects the trajectory of the ball in a unit of the plurality of frame images based on the image for detecting a ball trajectory output from image generator for detecting of ball trajectory 140 and the player region output from player region detector 160. Ball trajectory detector 150 outputs the position in which the detected ball is present on the trajectory that is a position of the ball in the final frame image among the plurality of frame images which are used for detecting the trajectory of the ball as the second ball position to ball position output unit 170. A detailed process for detecting the trajectory of the ball will be described below.

Ball position output unit 170 determines the final position of the ball, based on the first ball position output from ball tracking unit 130 for each one of the frame images, and the second ball position output from ball trajectory detector 150 for the plurality of frame images, for each of the plurality of frame images, and outputs the determined position as ball position information. Specifically, in a case where the both of the first ball position output from ball tracking unit 130 and the second ball position output from ball trajectory detector 150 are present in a certain frame image, ball position output unit 170 determines the final position of the ball, based on the first and second ball positions and outputs the determined position as the ball position information. On the other hand, in a case where only the first ball position output from ball tracking unit 130 is present in the certain frame image, ball position output unit 170 determines the first ball position as the final position of the ball, and outputs the determined position as the ball position information.

Figure 2:
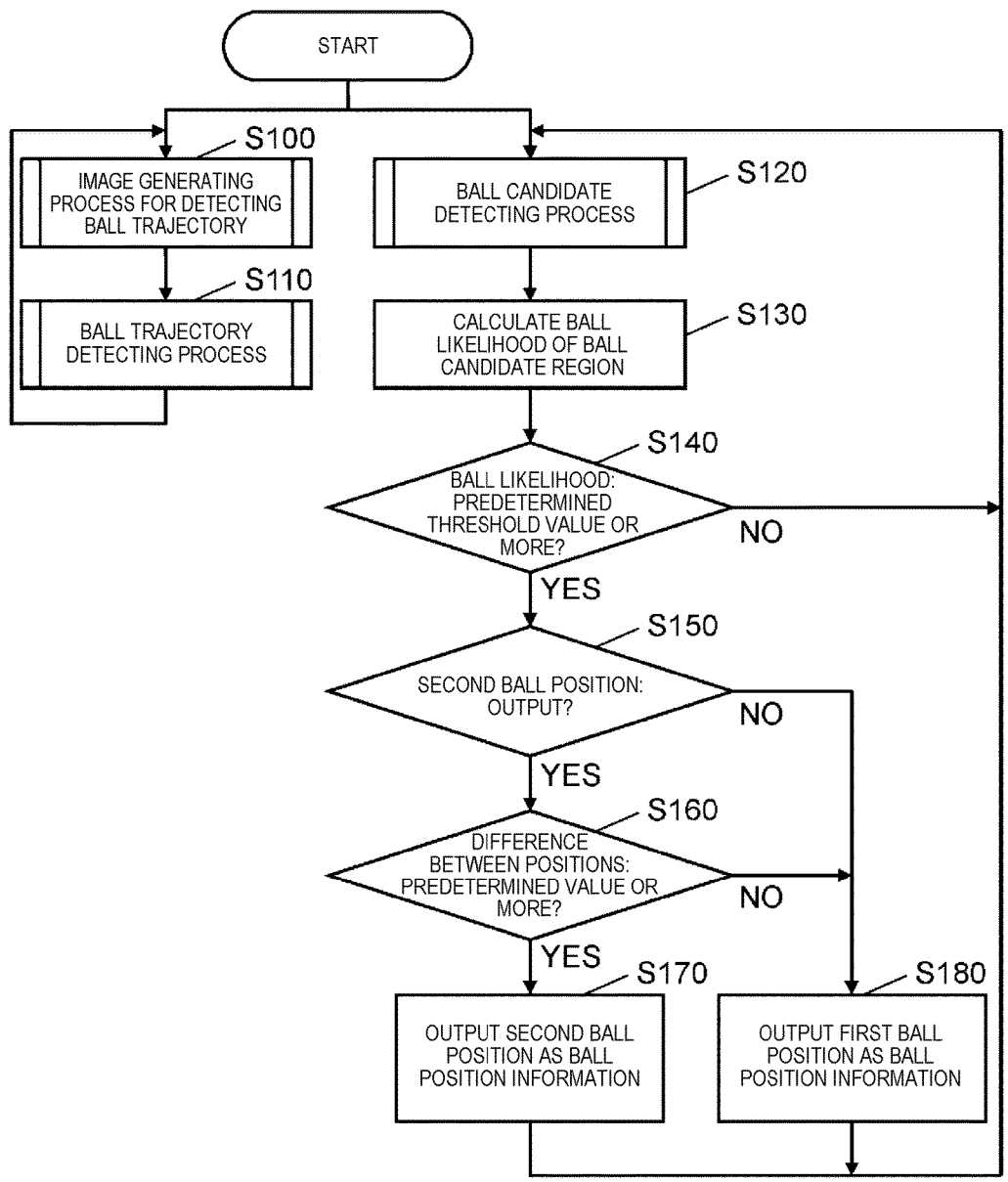
FIG. 2 is a flow chart illustrating an overall operation example of the moving body tracking device according to the present exemplary embodiment.

FIG. 2 is a flow chart illustrating an overall operation example of moving body tracking device 100 according to the present exemplary embodiment. Processes of steps S100 and S120 are started when the video is output from video input unit 110 to ball candidate detector 120, image generator for detecting of ball trajectory 140, and player region detector 160. A process illustrated in FIG. 2 is executed during all the frame images which configure the video are output from video input unit 110.

Figure 3:
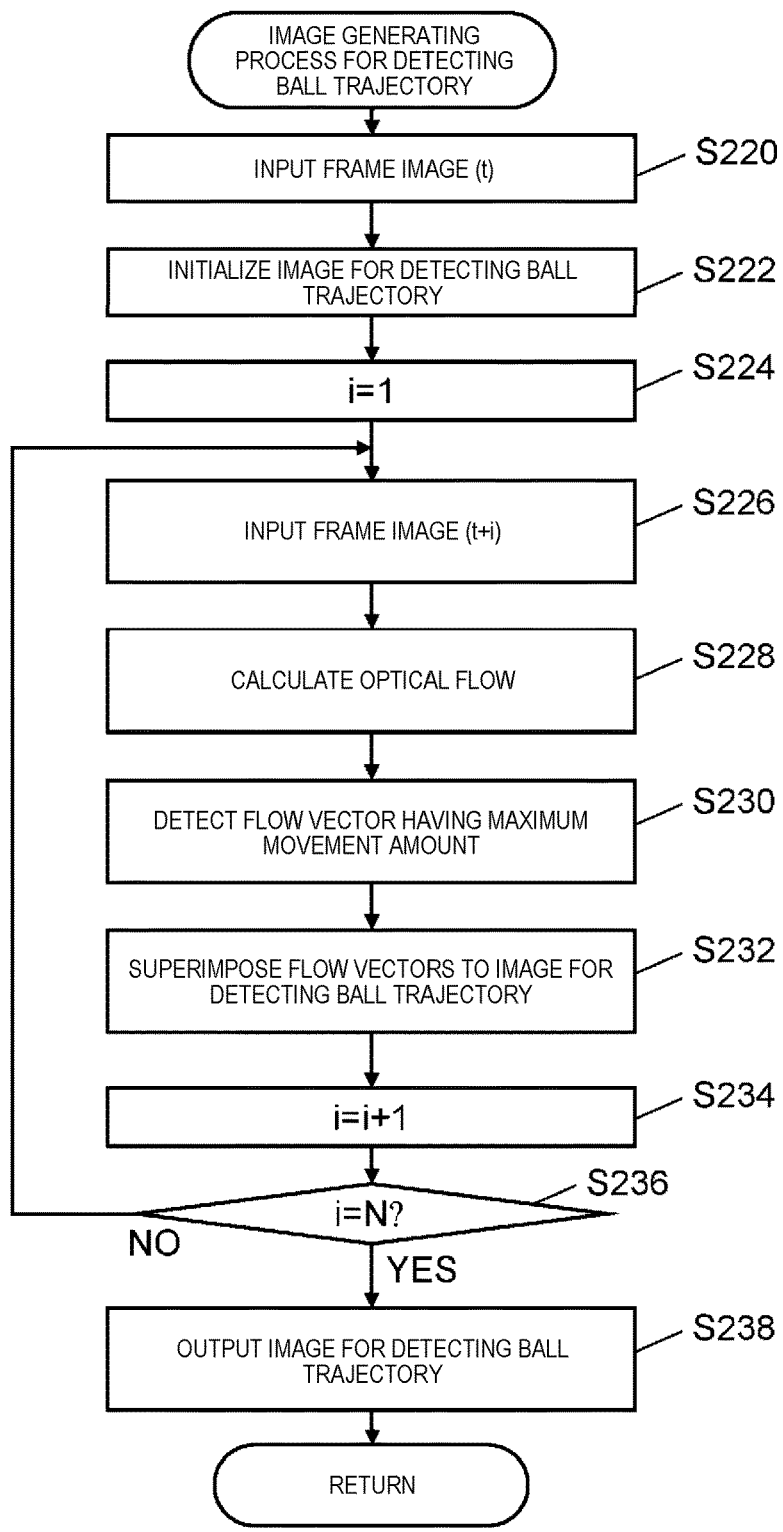
FIG. 3 is a flow chart illustrating an image generating operation for detecting a ball trajectory in the present exemplary embodiment.

First, image generator for detecting of ball trajectory 140 inputs the video output from video input unit 110 and generates the image for detecting a ball trajectory for detecting a trajectory of the ball in (in the present embodiment, natural number N) a unit of the plurality of frame images (step S100). FIG. 3 is a flow chart illustrating a detailed operation of step S100, that is, an image generating operation for detecting a ball trajectory.

Firstly, image generator for detecting of ball trajectory 140 inputs a frame image (t) output from video input unit 110 (step S220). Here, the frame image (t) indicates a frame image having the frame number of t.

Next, image generator for detecting of ball trajectory 140 initializes the image for detecting a ball trajectory (step S222). Specifically, image generator for detecting of ball trajectory 140 prepares an image having the same size of the frame image (t) input in step S220 and sets all of pixel values which configure the image to 0 (black).

Next, image generator for detecting of ball trajectory 140 sets a value of a variable i to be used in the image generating operation for detecting a ball trajectory to 1 (step S224). Next, image generator for detecting of ball trajectory 140 inputs a frame image (t+i) which is output from video input unit 110 (step S226).

Next, image generator for detecting of ball trajectory 140 calculates an optical flow using a frame image which is input in step S226 (for example, frame image (t+1), hereinafter, referred to as a "second frame image") and the frame image which is input before one frame (for example, frame image (t), hereinafter, referred to as a "first frame image") (step S228). Specifically, image generator for detecting of ball trajectory 140 obtains information that each pixel of the first frame image is moved to which pixel of the second frame image, that is, a flow vector.

Next, image generator for detecting of ball trajectory 140 detects the flow vector having a maximum movement amount among a lot of flow vectors based on the calculation result of step S228 (step S230). Next, image generator for detecting of ball trajectory 140 superimposes the image indicating a position (location) of the pixel corresponding to the flow vector detected in step S230 to the image for detecting a ball trajectory (step S232). Specifically, in the image for detecting a ball trajectory, image generator for detecting of ball trajectory 140 sets the pixel value around the position of the pixel corresponding to the flow vector detected in step S230 to 255 (white). For example, a rectangular region having 5×5 pixel or a circle region having 5 pixel of a diameter is set around the position of the pixel corresponding to the flow vector, and a value of the pixels which configure these regions is set to 255.

Next, image generator for detecting of ball trajectory 140 adds 1 to a value of the variable i (step S234). Next, image generator for detecting of ball trajectory 140 determines whether the value of the variable i is the same as N (step S236). As the result of the determination, in a case where the value of the variable i is not the same as N (step S236, NO), the process returns to before step S226.

On the other hand, in a case where the value of the variable i is the same as N (step S236, YES), image generator for detecting of ball trajectory 140 outputs the position of the flow vector having a maximum movement amount in the image for detecting a ball trajectory and a frame image (t+N−1) to ball trajectory detector 150 (step S238). In the output image for detecting a ball trajectory, the image corresponding to the flow vector having the maximum movement amount is superimposed in only N frame image. By terminating the process of step S238, image generator for detecting of ball trajectory 140 terminates a process in FIG. 3.

Figure 4:
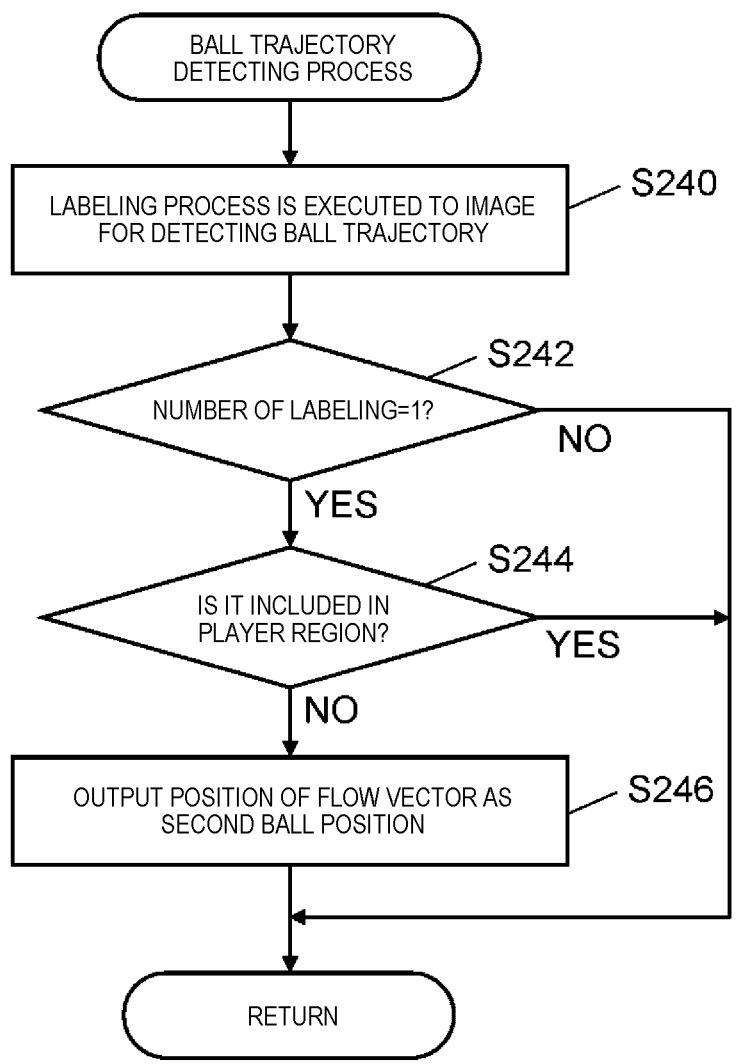
FIG. 4 is a flow chart illustrating a ball trajectory detecting operation in the present exemplary embodiment.

The process is returned to the flow chart of FIG. 2, ball trajectory detector 150 detects the trajectory of the ball in the unit of N frame image based on the image for detecting a ball trajectory output from image generator for detecting of ball trajectory 140 and the player region output from player region detector 160 (step S110). When the process of step S110 is terminated, the process returns to before step S100. FIG. 4 is a flow chart illustrating a ball trajectory detecting operation in the present embodiment.

Firstly, ball trajectory detector 150 executes a labeling process with respect to the image for detecting a ball trajectory output from image generator for detecting of ball trajectory 140 (step S240). Here, the labeling process is a process that a portion having 255 (white) of a pixel value is allocated to the continuous pixel with the same number.

Figure 5A:
FIG. 5A is a diagram illustrating an image which is generated by superimposing maximum portions of a flow vector.
Figure 5B:
FIG. 5B is a diagram illustrating an image which is generated by superimposing maximum portions of a flow vector.

Next, as the result of the executing the labeling process, ball trajectory detector 150 determines whether the number of labelings is 1 (step S242). FIG. 5A illustrates an image for detecting a ball trajectory in a case where the labeling number is 1. As illustrated in FIG. 5A, in a case where the number of labeling is 1, on the image for detecting a ball trajectory, a position of the pixel of white portion, that is, having a maximum movement amount is indicated such that the positions are connected in a time-series manner and the connected portion depicts the clear trajectory as the trajectory of the ball. FIG. 5B illustrates an image for detecting a ball trajectory in a case where the labeling number is 3. As a result of the determination, in a case where the number of the labelings is not 1 (step S242, NO), ball trajectory detector 150 terminates the process in FIG. 4.

On the other hand, in a case where the number of the labelings is 1 (step S242, YES), ball trajectory detector 150 determines whether the position of the flow vector output from image generator for detecting of ball trajectory 140 is included in the player region output from player region detector 160 (step S244). The determination is performed for preventing that the player running faster is wrongly detected as the trajectory of the ball. The determination whether the position of the flow vector output from image generator for detecting of ball trajectory 140 is included in the player region is not limited to the above method. For example, a foreground image is obtained and the determination may be performed whether the region is the player region or the ball region from the size (for example, a region width, a region height, the number of pixels, or the like) of the foreground region present in the position of the flow vector output from image generator for detecting of ball trajectory 140. In this case, player region detector 160 in FIG. 1 may be omitted. A detailed method for generating the foreground image will be described.

As a result of the determination, in a case where the position of the flow vector output from image generator for detecting of ball trajectory 140 is included in the player region (step S244, YES), ball trajectory detector 150 terminates the process in FIG. 4. On the other hand, in a case where the position of the flow vector output from image generator for detecting of ball trajectory 140 is not included in the player region, that is, in a case where the trajectory of the ball is detected (step S244, NO), ball trajectory detector 150 outputs the position of the flow vector output from image generator for detecting of ball trajectory 140 to ball position output unit 170 as the second ball position (step S246). The process of step S246 is terminated. Accordingly, ball trajectory detector 150 terminates the process in FIG. 4.

Figure 6:
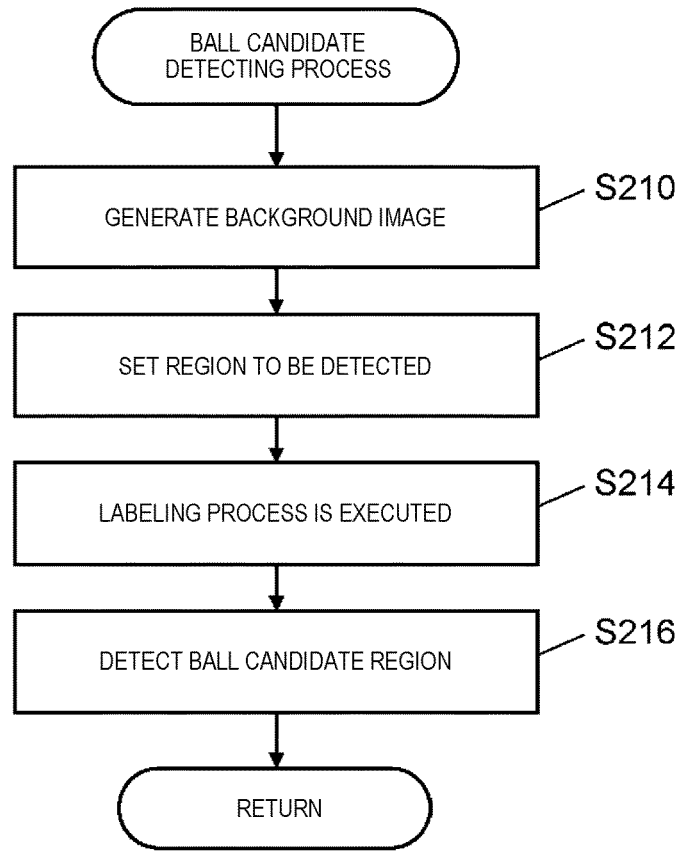
FIG. 6 is a flow chart illustrating a ball candidate detecting operation in the present exemplary embodiment.

The process returns to the flow chart of FIG. 2, and in step S120, ball candidate detector 120 detects the region of the ball candidate to be used in the soccer game as the ball candidate region, in each of the plurality of frame images which configure the video output from video input unit 110. FIG. 6 is a flow chart illustrating a ball candidate detecting operation in the present embodiment.

Firstly, ball candidate detector 120 generates the foreground image from the frame image output from video input unit 110 (step S210). Here, the foreground image is a binary image in which the pixel value of the pixel which configures the background portion is set to 0 (black) and the pixel value of the pixel which configures the foreground portion is set to 255 (white). As a method for generating the foreground image, a well-known background differencing technique, an inter-frame differencing technique, or the like is included.

Next, ball candidate detector 120 sets the region to be detected for detecting the region of the ball candidate, among the generated foreground images (step S212). Specifically, ball candidate detector 120 calculates a movement prediction position of the ball based on ball position information output from ball position output unit 170 for last frame image, and sets the region having a certain size which uses the movement prediction position as a center, as the region to be detected. By setting the region to be detected, a process load of the ball candidate detecting operation can be reduced compared to a case where the all of the regions of the foreground image are set as the region to be detected.

Next, ball candidate detector 120 executes the labeling process with respect to the region set to the region to be detected among the foreground images (step S214). Finally, ball candidate detector 120 obtains the size (for example, the region width, the region height, horizontal to vertical ratio or foreground ratio within the region, or the like) of the pixel region which is allocated with the same number from the execution result of the labeling process, and detects the pixel region in which the obtained size satisfies a predetermined condition as the ball candidate region (step S216). The predetermined condition is an upper limit of the region width and the region height, upper and lower limits of the horizontal to vertical ratio, a lower limit of the foreground ratio within the region, or the like. Ball candidate detector 120 outputs the position in the frame image of the detected ball candidate region, the region width, the region height, and the frame image to ball tracking unit 130. By terminating the process in step S216, ball candidate detector 120 terminates the process in FIG. 6. The setting of the region to be detected (step S212) is not a necessary method, and the following process may be performed in the entire foreground images. In this case, a correct ball candidate can be obtained even when the error occurs in the movement prediction position of the ball. Even when the process load is increased, the increase in the process time can be prevented by parallelization of the following processes, for example.

The process returns to the flow chart of FIG. 2, in the frame image output from ball candidate detector 120, ball tracking unit 130 calculates the ball likelihood based on the feature amount of the ball candidate region (step S130). The feature amount is calculated based on the position, the region width, and the region height in the frame image of the ball candidate region output from ball candidate detector 120. The feature amount may use the feature amount using an optical feature amount of the frame image, or may use a combination of the left-described elements and the optical feature amount. Next, ball tracking unit 130 determines whether the calculated ball likelihood is equal to or more than the predetermined threshold value (step S140). As the result of the determination, in a case where the ball likelihood is equal to or more than the predetermined threshold valve (step S140, NO), the process returns to before step S120.

On the other hand, in a case where the ball likelihood is equal to or more than the predetermined threshold value (step S140, YES), ball tracking unit 130 detects the position of the ball candidate region as the first ball position, and outputs the detected position to ball position output unit 170. Next, ball position output unit 170 determines whether the second ball position is output from ball trajectory detector 150 (step S150). As the result of the determination, in a case where the second ball position is not output (step S150, NO), ball position output unit 170 determines the first ball position output from ball tracking unit 130 as the final position of the ball, and outputs the determined position as the ball position information (step S180). In a case where the plurality of ball candidate regions are present in the frame image output from ball candidate detector 120, ball tracking unit 130 calculates the ball likelihood for each of the plurality of ball candidate regions, detects the position of the ball candidate region having a predetermined threshold value or more, and having a maximum ball likelihood as the first ball position, and outputs the detected position. Thereafter, the process returns to before step S120.

On the other hand, in a case where the second ball position is output (step S150, YES), ball position output unit 170 determines whether the difference between the first ball position output from ball tracking unit 130 and the second ball position output from ball trajectory detector 150 is equal to or more than the predetermined value (for example, 3 pixels) (step S160). In a case where a positional coordinate of the first ball position and the second ball position is defined as (X1, Y1) and (X2, Y2), the difference between the first ball position and the second ball position is calculated by Expression (1) below.

$$\text{Difference}=SQR((X2-X1)^2+(Y2-Y1)^2) \tag{1}$$

As the result of the determination, in a case where the difference between the first ball position and the second ball position is not equal to or more than the predetermined value (Step S160, NO), the process proceeds to step S180. On the other hand, in a case where the difference between the first ball position and the second ball position is equal to or more than the predetermined value (step S160, YES), ball position output unit 170 determines the second ball position output from ball trajectory detector 150 as a final position of the ball, and outputs the determined position as the ball position information (step S170). Thereafter, the process returns to before step S120.

As the detailed description above, in the present exemplary embodiment, the processor detects the position of the ball in each of the plurality of frame images which configure the video, detects the trajectory of the ball based on the image obtained using the plurality of frame images, determines the final position of the ball in each of the plurality of frame images based on the detected position and the position of the ball obtained from the detected trajectory, and outputs the determined position.

According to the present exemplary embodiment having such a configuration, even when the ball to be tracked is tracked by mistake with the other moving bodies, a ball position is automatically corrected to a correct ball position for a certain time interval by using a position of the ball which is obtained from the detected ball trajectory. Therefore, the ball can be tracked in the video with high accuracy.

In the exemplary embodiment, an example in which ball candidate detector 120 and ball tracking unit 130 which have a configuration for detecting the first ball position, image generator for detecting of ball trajectory 140 and ball trajectory detector 150 which have a configuration for detecting the second ball position are integrally formed is described. However, the elements may be separately formed by separate devices.

In addition, in the exemplary embodiment, in a case where the difference between the first ball position and the second ball position is not equal to or more than the predetermined value, an example in which the first ball position output from ball tracking unit 130 is output as the ball position information is described. However, the second ball position output from ball trajectory detector 150 may be output as the ball position information.

In addition, in the exemplary embodiment, an example, in which the movement amount of the pixel between the plurality of frame images is detected, the trajectory of the ball is detected by connecting the positions of the pixel having a maximum movement amount in a time-series manner, is described. However, the present disclosure is not limited thereto. For example, as illustrated in the flow charts of FIGS. 7 and 8, the foreground images which are generated from each of the plurality of frame images are superimposed and the trajectory of the ball may be detected by extracting a profile having a predetermined shape from the superimposed images.

Figure 7:
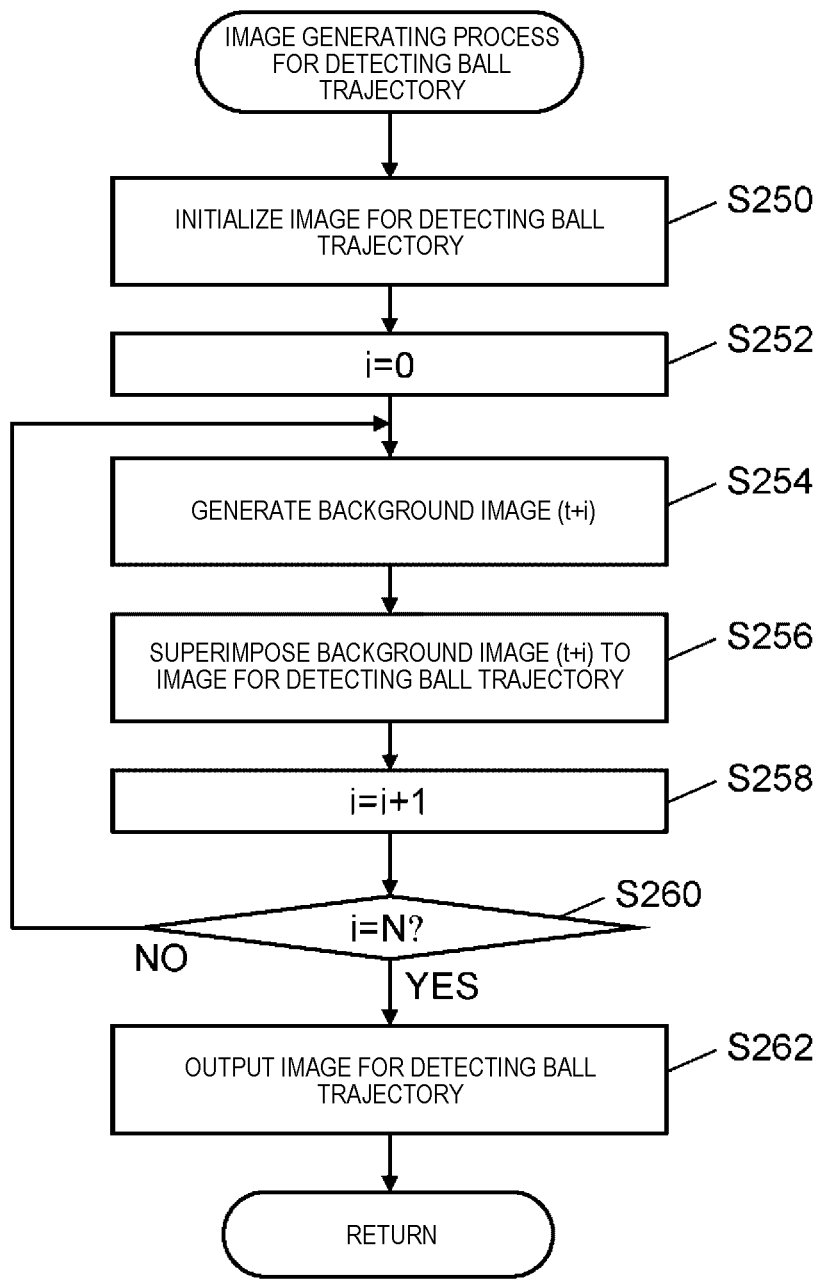
FIG. 7 is a flow chart illustrating a modification example of an image generating operation for detecting a ball trajectory in the present exemplary embodiment.
Figure 8:
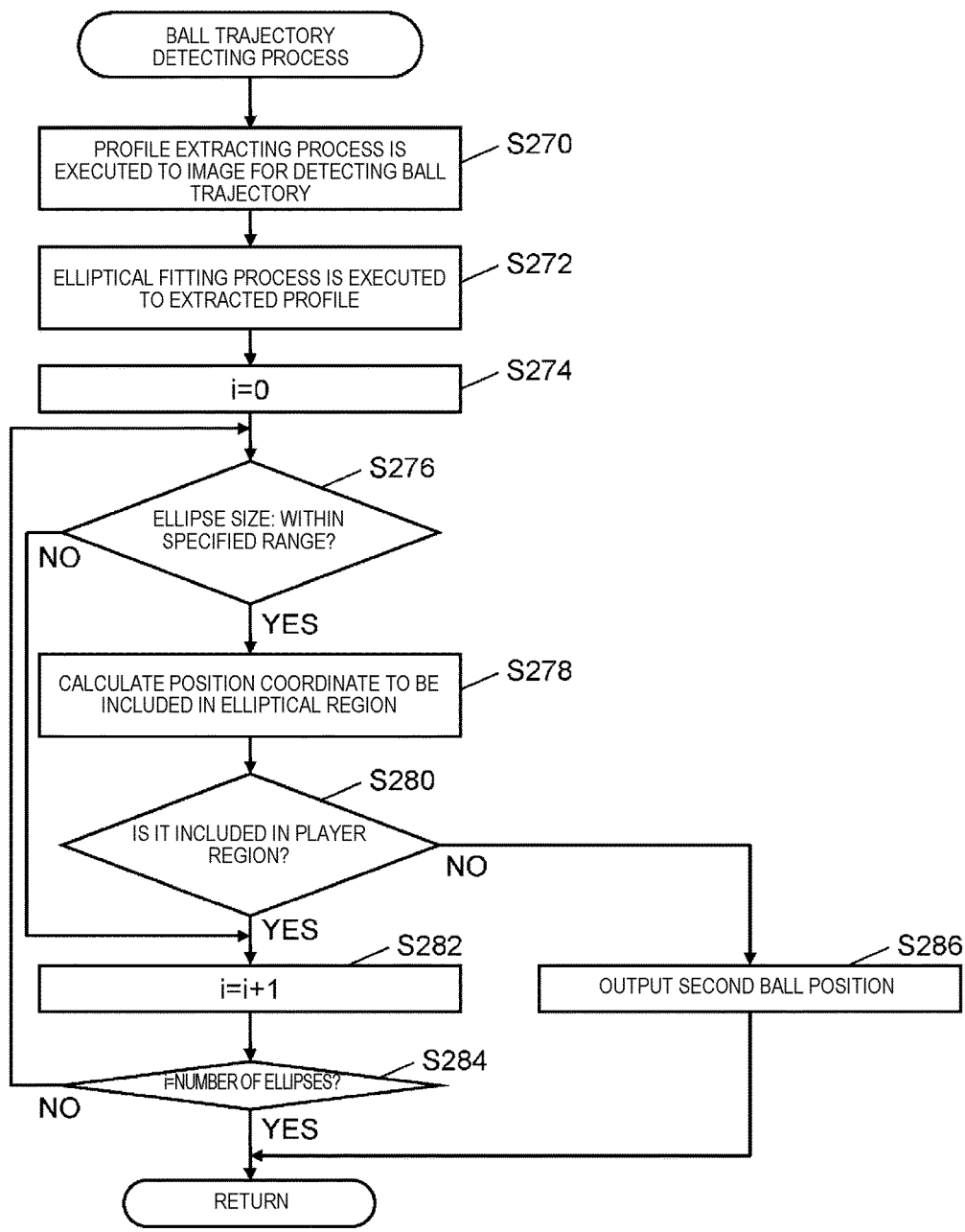
FIG. 8 is a flow chart illustrating a modification example of a ball trajectory detecting operation in the present exemplary embodiment.

FIG. 7 is a flow chart illustrating a modification example of step S100 of FIG. 2, that is, a modification example of an image generating operation for detecting a ball trajectory. FIG. 8 is a flow chart illustrating a modification example of step S110 of FIG. 2, that is, a modification example of an image generating operation for detecting a ball trajectory.

An image generating operation for detecting a ball trajectory illustrated in FIG. 7 will be described. Firstly, image generator for detecting of ball trajectory 140 initializes the image for detecting a ball trajectory (step S250). Specifically, image generator for detecting of ball trajectory 140 prepares an image having the same size of the frame image (t) output from video input unit 110 and sets all of pixel values which configure the image to 0 (black).

Next, image generator for detecting of ball trajectory 140 sets a value of a variable i to be used in the image generating operation for detecting a ball trajectory to 0 (step S252). Next, image generator for detecting of ball trajectory 140 generates the foreground image (t+i) from the frame image (t+i) output from video input unit 110 (step S254).

Next, image generator for detecting of ball trajectory 140 superimposes the foreground image (t+i) to the image for detecting a ball trajectory (step S256). Before superimposing the foreground image (t+i), a noise may be removed by performing a contraction and expansion process with respect to the foreground image (t+i).

Next, image generator for detecting of ball trajectory 140 adds 1 to a value of the variable i (step S258). Next, image generator for detecting of ball trajectory 140 determines whether the value of the variable i is the same as N (step S260). As the result of the determination, in a case where the value of the variable i is not the same as N (step S260, NO), the process returns to before step S254.

On the other hand, in a case where the value of the variable i is the same as N (step S260, YES), image generator for detecting of ball trajectory 140 outputs the image for detecting a ball trajectory and the foreground image (t+N−1) to ball trajectory detector 150 (step S262). In the output image for detecting a ball trajectory, only N numbers of foreground images which are generated from the frame image are superimposed. By terminating the process of step S262, image generator for detecting of ball trajectory 140 terminates the process in FIG. 7.

Next, a ball trajectory detecting operation illustrated in the flow chart of FIG. 8 will be described. Firstly, ball trajectory detector 150 executes a profile extracting process to the image for detecting a ball trajectory output from image generator for detecting of ball trajectory 140 and extracts a profile line among the images for detecting the ball trajectory (step S270).

Next, ball trajectory detector 150 detects the profile line having an elliptical shape which is obtained such that a well-known elliptical fitting process is subjected to the extracted profile line (step S272). Next, ball trajectory detector 150 sets the value of the variable i to be used in the ball trajectory detecting operation to 0 (step S274).

Next, ball trajectory detector 150 determines whether the size of the profile line having the elliptical shape which is detected in step S272 is within a specific range (for example, L1≤long diameter≤L2 and S1≤short diameter≤S2) (step S276). The specific range is preferably an elongated ellipse (the ratio of the long diameter to the short diameter is extremely high). In general, the players and the ball are included in the foreground image. When the player is superimposed, the ellipse closer to a circle tends to be fitted, and when the ball is superimposed, the elongated ellipse tends to be fitted. As a detailed ratio of the short diameter and the long diameter, it is preferable that the range of the value which is detected based on the number of the frames such as 1: αN (α: function of the ball speed, N: the number of frames) is included. As the result of the determination, in a case where the ratio is not within the specific range (step S276: NO), the process proceeds to step S282.

On the other hand, in a case where the ratio is within the specific range (step S276, YES), in the foreground image (t+N−1) output from image generator for detecting of ball trajectory 140, ball trajectory detector 150 calculates the positional coordinate of the foreground region included in the elliptical region surrounded by the profile line having the elliptical shape (step S278).

Figure 9A:
FIG. 9A is a diagram illustrating an image which is obtained by superimposing foreground images.
Figure 9B:
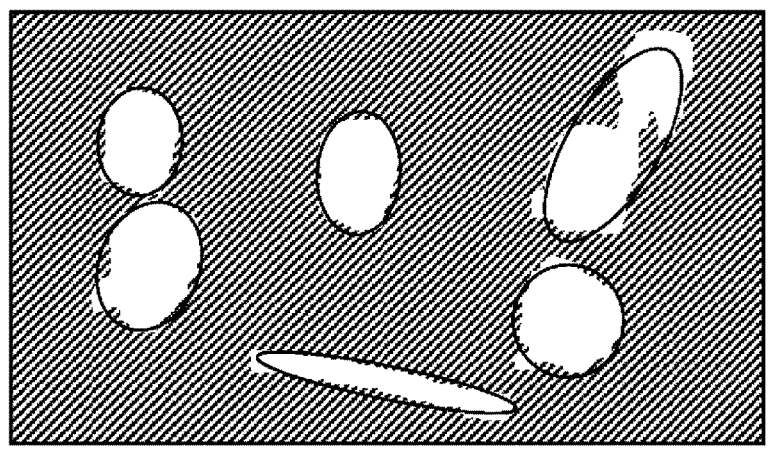
FIG. 9B is a diagram illustrating an image which is obtained by superimposing foreground images.

Next, ball trajectory detector 150 determines whether the calculated positional coordinate is included in the player region output from player region detector 160 (step S280). As the result of the determination, in a case where the calculated positional coordinate is not included in the player region (step S280, NO), ball trajectory detector 150 outputs the positional coordinate calculated in the last step S278 as the second ball position to ball position output unit 170 (step S286). By terminating the process of step S286, ball trajectory detector 150 terminates the process in FIG. 8. FIG. 9A illustrates an image for detecting a ball trajectory output from image generator for detecting of ball trajectory 140. A white region in FIG. 9A is a region that the foreground images are superimposed. In FIG. 9A, a process for expending the foreground image is added for performing the ellipse fitting with high accuracy. When expanding such a foreground image, since it is difficult to end the foreground image, the ellipse fitting is easily performed as a region, even when the speed of the ball is increased. As illustrated in FIG. 9B which is obtained by enlarging FIG. 9A, as a result of performing the ellipse fitting with respect to the profile of the foreground image, it is considered that the ellipse in the lower portion of FIG. 9B is an elongated ellipse having a high possibility that the trajectory of the ball is indicated (YES in step S276). Ball trajectory detector 150 executes the processes for the elongated ellipse after step S278.

On the other hand, in a case where the positional coordinate is included in the player region (step S280, YES), ball trajectory detector 150 adds 1 to a value of the variable i (step S282). Next, ball trajectory detector 150 determines whether the value of the variable i is the same as the number of the profile lines (the number of ellipses) having an elliptical shape which is detected by the ellipse fitting process (step S284). As a result of the determination, in a case where the value of the variable i is not the same as the number of the profile lines having the elliptical shape (step S284, NO), the process returns to before step S276. On the other hand, in a case where the value of the variable i is the same as the number of the profile lines having the elliptical shape (step S284, YES), ball trajectory detector 150 terminates the process in FIG. 8. FIGS. 9A and 9B illustrate the image for detecting a ball trajectory output from image generator for detecting of ball trajectory 140. In FIGS. 9A and 9B, a portion similar to the elongated circle having a high possibility in which the trajectory of the ball is indicated is present in a portion surrounded by a round frame. Ball trajectory detector 150 extracts the profile line including the profile line of the elliptical portion, performs a process such as the above-described ellipse fitting, and in the foreground image (t+N−1) output from image generator for detecting of ball trajectory 140, calculates the positional coordinate of the foreground region included in the region similar to the elongated ellipse.

The determination whether the calculated positional coordinate is included in the player region output from player region detector 160 is not limited to the above method. For example, when the positional coordinate of the foreground region included in the ellipse region surrounded by the profile line having the elliptical shape is calculated (step S278), the size of the foreground region included in the elliptical region is calculated and the determination whether the region is the player region or the ball region may be performed from the calculated size. In this case, an expanding process with respect to the foreground image (t+N−1) output from image generator for detecting of ball trajectory 140 may be added. The reason for the adding is that it is prevented that a part of the body such as limbs of the player running faster is separated.

Figure 10:
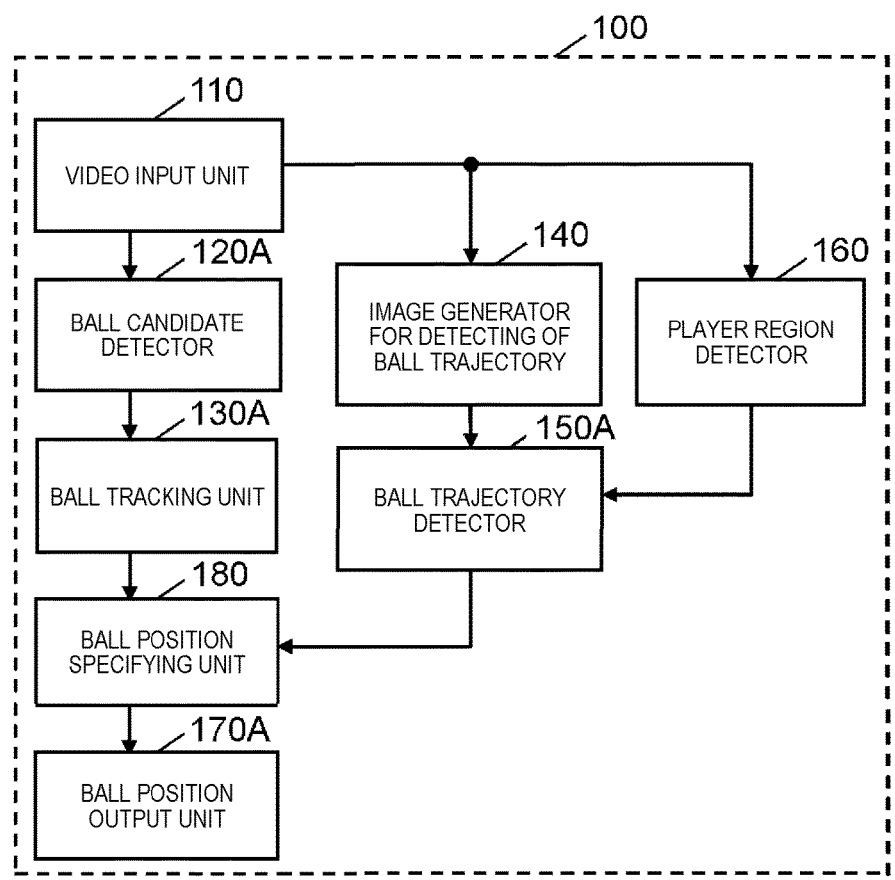
FIG. 10 is a diagram illustrating a modification example of a configuration of the moving body tracking device in the present exemplary embodiment.

In addition, in the present exemplary embodiment, moving body tracking device 100 may have a functional configuration illustrated in FIG. 10. In FIG. 10, components having the same reference numerals as those shown in FIG. 1 have the same functions and repetitive description will be omitted.

In each of the plurality of frame images which configure the video output from video input unit 110, ball candidate detector 120A detects the region of the ball candidate to be used in the soccer game as the ball candidate region using a size, a color, or the like, for example. The plurality of ball candidate regions are detected by ball candidate detector 120A. Ball candidate detector 120A outputs the position in the frame image of the detected plurality of ball candidate regions to ball tracking unit 130A.

Ball tracking unit 130A updates the position of the plurality of ball candidate regions to be tracked by using the position of the plurality of ball candidate regions output from ball candidate detector 120. Specifically, ball tracking unit 130A determines whether there is the same ball candidate region between a past (last) frame image and a present frame image by using a movement distance, for example, and associates the first ball position that is the same ball candidate region between the frame images. Ball tracking unit 130A outputs the position of the updated plurality of ball candidate regions as the plurality of first ball positions to ball position specifying unit 180.

Ball trajectory detector 150A detects the trajectory of the ball in a unit of the plurality of frame images based on the image for detecting a ball trajectory output from image generator for detecting of ball trajectory 140 and the player region output from player region detector 160. Ball trajectory detector 150A outputs the position in which the detected ball is present on the trajectory, that is, a position of the ball in the final frame image among the plurality of frame images which are used for detecting the trajectory of the ball as the second ball position to ball position specifying unit 180.

Ball position specifying unit 180 obtains the first ball position in which it cannot be clearly determined as the ball position among the plurality of first ball positions output from ball tracking unit 130A. For example, the first ball position in which a position is not updated on the predetermined number of frame images or the first ball position in which a movement direction is changed for each frame image, that is, which is moved unlike the ball, as the first ball position which cannot be clearly determined as the position of the ball. Ball position specifying unit 180 outputs first ball position excluding the first ball position which cannot be clearly determined as the position of the ball to ball position output unit 170A. In addition, in a case where the second ball position is output from ball trajectory detector 150, ball position specifying unit 180 outputs the first ball position having a minimum difference between the second ball positions among the plurality of first ball positions output from ball tracking unit 130A to ball position output unit 170A.

Ball position output unit 170A determines a first ball position which is output from ball position specifying unit 180 as a final position of the ball, and outputs the determined position as ball positional information. According to the configuration of moving body tracking device 100 illustrated in FIG. 10, it is possible to automatically determine the accurate ball position using the detection result of the ball trajectory, even in a case where a plurality of the ball positions to be tracked are detected. Therefore, the ball can be tracked in the video with high accuracy.

In addition, in the present exemplary embodiment, an example in which moving body tracking device 100 tracks the ball in the sport video in which the soccer game is imaged is described. However, in the sport video in which the other sport game is imaged, moving body tracking device 100 may track the moving body to be used in the game. Furthermore, moving body tracking device 100 may track the moving body in the video other than the sport video.

Furthermore, the present exemplary embodiment is a mere example of embodying for carrying out the present disclosure, and the technical range of the present disclosure should not be construed limitedly on the basis thereof. In other words, the present disclosure can be carried out in various configurations without departing from the gist or main features thereof.

INDUSTRIAL APPLICABILITY

The present disclosure is useful as a moving body tracking method and a moving body tracking device which are capable of tracking a moving body in a video with high accuracy.

The invention claimed is:

1. A moving body tracking method comprising:
    detecting, by a processor, a first position of a moving body in each image frame of a plurality of image frames of a video,
    detecting, by the processor, independently of the detecting of the first position of the moving body, a trajectory of the moving body per a unit of the plurality of image frames, using the plurality of image frames,
    determining, by the processor, a final position of the moving body in each image frame of the plurality of image frames by selecting one of the detected first position and a second position of the moving body obtained from the detected trajectory, and
    outputting, by the processor, the determined final position for each image frame of the plurality of image frames.

2. The moving body tracking method of claim 1, wherein a time interval for detecting the trajectory of the moving body is greater than a time interval for detecting the first position of the moving body.

3. The moving body tracking method of claim 1, wherein the processor determines the final position of the moving body based on a difference between the detected first position and the second position on the detected trajectory.

4. The moving body tracking method of claim 3, wherein, when the difference is lower than a predetermined value, the processor selects the detected first position as the final position of the moving body.

5. The moving body tracking method of claim 1,
wherein the processor detects a movement amount of a pixel between the plurality of image frames, and detects the trajectory by superimposing images indicating a position of the pixel in which the movement amount has a maximum value.

6. The moving body tracking method of claim 1,
wherein the processor detects the trajectory by superimposing foreground images which are generated from the plurality of image frames and by extracting a profile having a predetermined shape from the superimposed images.

7. The moving body tracking method of claim 1,
wherein the video is a sport video in which a sport game is imaged, and
the moving body is a ball used in the sport game.

8. A moving body tracking device comprising:
a processor that performs operations comprising:
detecting a first position of a moving body in each image frame of a plurality of image frames of a video,
detecting, independently of the detecting the first position of the moving body, a trajectory of the moving body per a unit of the plurality of image frames, using the plurality of image frames,
determining a final position of the moving body in each image frame of the plurality of image frames by selecting one of the detected first position of the moving body and a second position of the moving body obtained from the detected trajectory of the moving body, and
outputting the final determined position for each image frame of the plurality of image frames.

9. The moving body tracking device of claim 8,
wherein a time interval for detecting the trajectory of the moving body is greater than a time interval for detecting the first position of the moving body.

10. The moving body tracking device of claim 8,
wherein the processor determines the final position of the moving body based on a difference between the detected first position and the second position on the detected trajectory.

11. The moving body tracking device of claim 10,
wherein, when the difference is lower than a predetermined value, the processor selects the detected first position as the final position of the moving body.

12. The moving body tracking device of claim 8,
wherein the processor detects a movement amount of a pixel between the plurality of image frames, and detects the trajectory by superimposing images indicating a position of the pixel in which the movement amount has a maximum value.

13. The moving body tracking device of claim 8,
wherein the processor detects the trajectory by superimposing foreground images which are generated from the plurality of image frames and by extracting a profile having a predetermined shape from the superimposed images.

14. The moving body tracking device of claim 8,
wherein the video is a sport video in which a sport game is imaged, and
the moving body is a ball used in the sport game.

15. The moving body tracking method of claim 1, wherein, the detecting of the trajectory of the moving body is performed without using the first position of the moving body detected in each image frame of the plurality of image frames.

16. The moving body tracking device of claim 8, wherein the processor detects the trajectory of the moving body without using the first position of the moving body detected in each image frame of the plurality of image frames.

17. The moving body tracking method of claim 3, wherein when the difference is greater than a predetermined value, the processor selects the detected second position as the final position of the moving body.

18. The moving body tracking device of claim 10, wherein, when the difference is greater than a predetermined value, the processor selects the detected second position as the final position of the moving body.

* * * * *